(12) United States Patent
Solterbeck

(10) Patent No.: US 6,338,185 B1
(45) Date of Patent: Jan. 15, 2002

(54) HELICAL ROPE CLIP

(76) Inventor: Norman W. Solterbeck, 810 NW. 14th Ave., Payette, ID (US) 83661

( * ) Notice: Subject to any disclaimer, the term of this patent is extended or adjusted under 35 U.S.C. 154(b) by 0 days.

(21) Appl. No.: 09/579,834

(22) Filed: May 26, 2000

(51) Int. Cl.$^7$ ................................................ F16G 11/00
(52) U.S. Cl. ................ 24/131 C; 24/131 R; 24/129 R; 24/129 C
(58) Field of Search ................ 24/131 R, 129 R, 24/131 C, 129 C, 115 N

(56) References Cited

U.S. PATENT DOCUMENTS

| | | | | |
|---|---|---|---|---|
| 788,136 A | * | 4/1905 | Heilrath | 24/131 C X |
| 873,027 A | * | 10/1907 | Davis | 24/131 R |
| 1,633,792 A | * | 6/1927 | Pete et al. | 24/131 C |
| 1,687,409 A | * | 10/1928 | Weber | 24/129 C |
| 1,698,027 A | * | 1/1929 | Seurynck | 24/129 C |
| 1,744,159 A | * | 1/1930 | Doty | 24/139 C |
| 1,780,184 A | * | 11/1930 | Gleason | 24/129 C X |
| 2,142,952 A | * | 1/1939 | Rathgeber | 24/131 R X |
| 2,469,550 A | | 5/1949 | Fair | 24/184 |
| 2,478,184 A | * | 8/1949 | Elliot | 24/131 C |
| 2,565,268 A | | 8/1951 | Rebotsky | 24/237 |
| 2,825,522 A | | 3/1958 | Bolmes et al. | 248/361 |
| 2,914,139 A | | 11/1959 | Rose | 188/65.1 |
| 2,957,220 A | | 10/1960 | Rose | 24/134 |
| 2,978,768 A | | 4/1961 | Heapy | 24/134 |
| 3,934,315 A | | 1/1976 | Millheiser et al. | 24/230 |
| 4,236,282 A | * | 12/1980 | Harvey, Jr. | 24/131 C |
| 4,413,381 A | * | 11/1983 | Fidock | 24/131 C |
| 4,823,444 A | | 4/1989 | Larsen | 24/231 |
| 5,957,354 A | | 9/1999 | Mentken | 224/614 |

* cited by examiner

Primary Examiner—Anthony Knight
Assistant Examiner—Ruth C. Rodriguez
(74) Attorney, Agent, or Firm—Frank J. Dykas; Robert L. Shaver; Stephen M. Nipper

(57) ABSTRACT

A tie-down clip for assisting in the cinching of a rope or other flexible, elongated object. The tie-down clip has an eyelet, a rope attachment means for attachment to a rope and a helical extension extending from the rope attachment means for cooperation with the rope and assisting in cinching of the rope.

13 Claims, 7 Drawing Sheets

HELICAL ROPE CLIP

BACKGROUND OF THE INVENTION

1. Field of the Invention

The present invention generally relates to ropes, and more particularly to devices assisting and cinching down ropes.

2. Background Information

Ropes are frequently used to tie down loads of materials, for instance tying bales of insulation down into the back of truck. Typically this is done by placing the material into the back of a vehicle or trailer by tying one end of the rope to one side of the vehicle, extending the rope across the material loaded, and tying down the rope on the other side of the load. There are various methods for cinching down this rope, typically done by special tie-down mounts in the body or frame of the vehicle wherein the user applies pressure and pulls the rope taught, quickly tying a knot into the rope. Another method of tying such a load down involves tying special knots along the length of the rope and through these knots extending the end of the rope thereby cinching the rope down. What is needed is a device for attachment to a rope that assists in this tie-down by making the tie-down easier to use and able to get a much taughter rope.

It is an object of the present invention to provide a tie-down for taughtly cinching a rope.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention is a tie-down clip for assisting in the cinching of a rope. This tie-down clip has a rope attachment means for attaching the tie-down clip to the rope. Extending from this rope attachment means is a helical extension. This helical extension extends away from the eyelet and terminates in a tip. The helical extension is able to receive there through the center portion of the rope, thereby the user is able to grasp the free end of the rope and pull on it in relation to the helical extension, thereby causing a cinching up of the rope that extends from the eyelet attachment to the rope's contact with the helical extension.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1A:
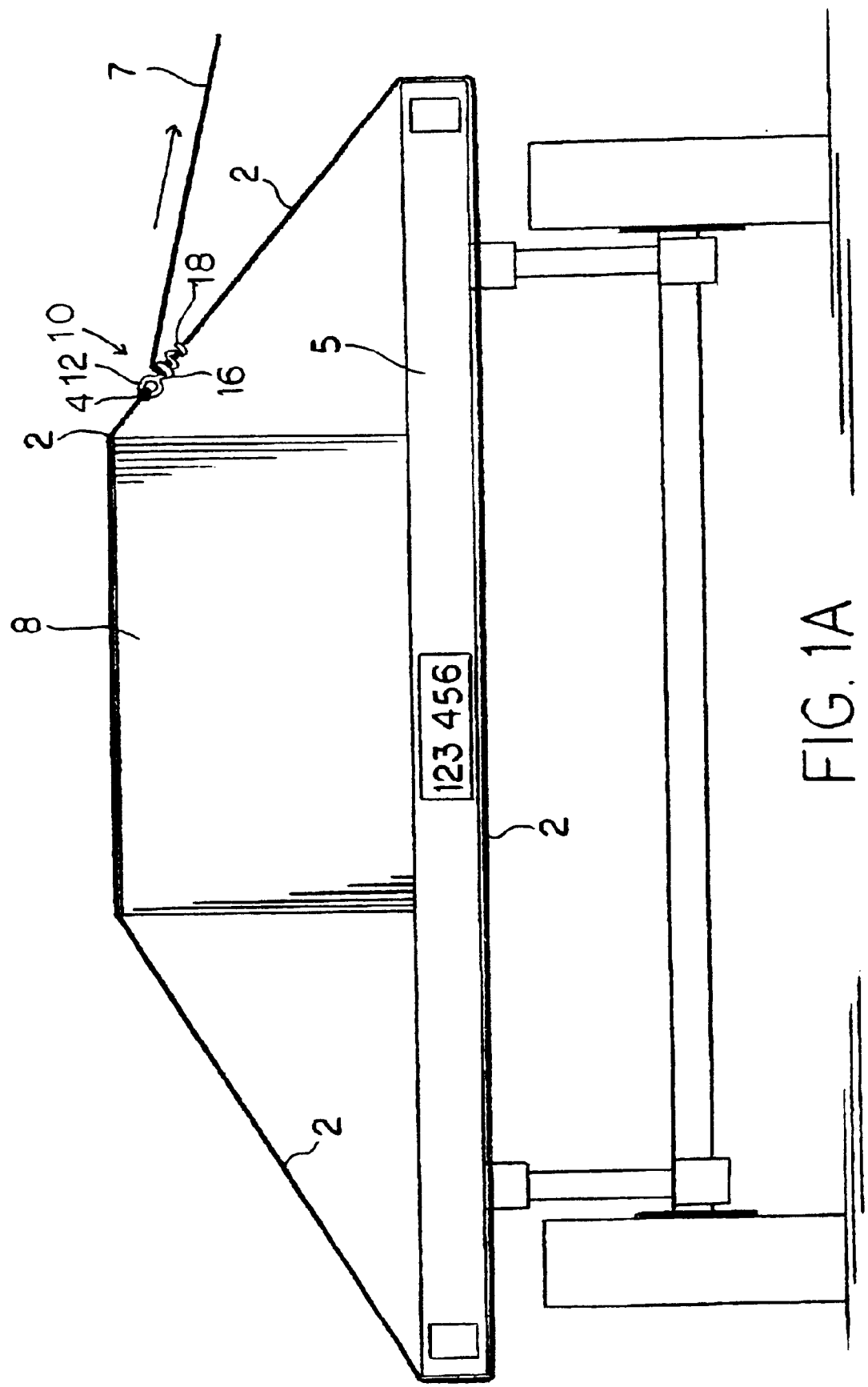
FIG. 1 is an environmental view of one embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is tie-down clip 10 for assisting in the cinching of rope. The term "rope" includes all types of rope, chain, wire, cabling, and strapping made of any material. FIG. 1A shows the rope 2 attaching to the tie-clip 10. This rope has a first end 4 which attaches to the tie-down clip 10 at a rope attachment means 12 located on the tie down clip 10. Extending from this rope attachment means 12 is a helical extension 16. This helical extension 16 terminates in a tip 18. While the preferred helical extension 16 is generally conical, other types of helical extensions are also envisioned, including cylindrical. In this manner, the helical extension 16 defines a passageway. This passageway 44 (shown in FIGS. 7 and 8) is able to receive therethrough the length of said rope 2. As can be seen in FIG. 1A, the tie-down clip 10 is shown attached to the rope 2 and extending around an object 8, holding the object on a trailer 5. When used in this fashion, the tie-down clip 10 can be used to cinch the rope 2 taught, thereby securing the object 8 on the trailer 5. When the rope 2 is taught, the rope 2 will be fixed taught through standard means such as a knot.

Figure 1B:
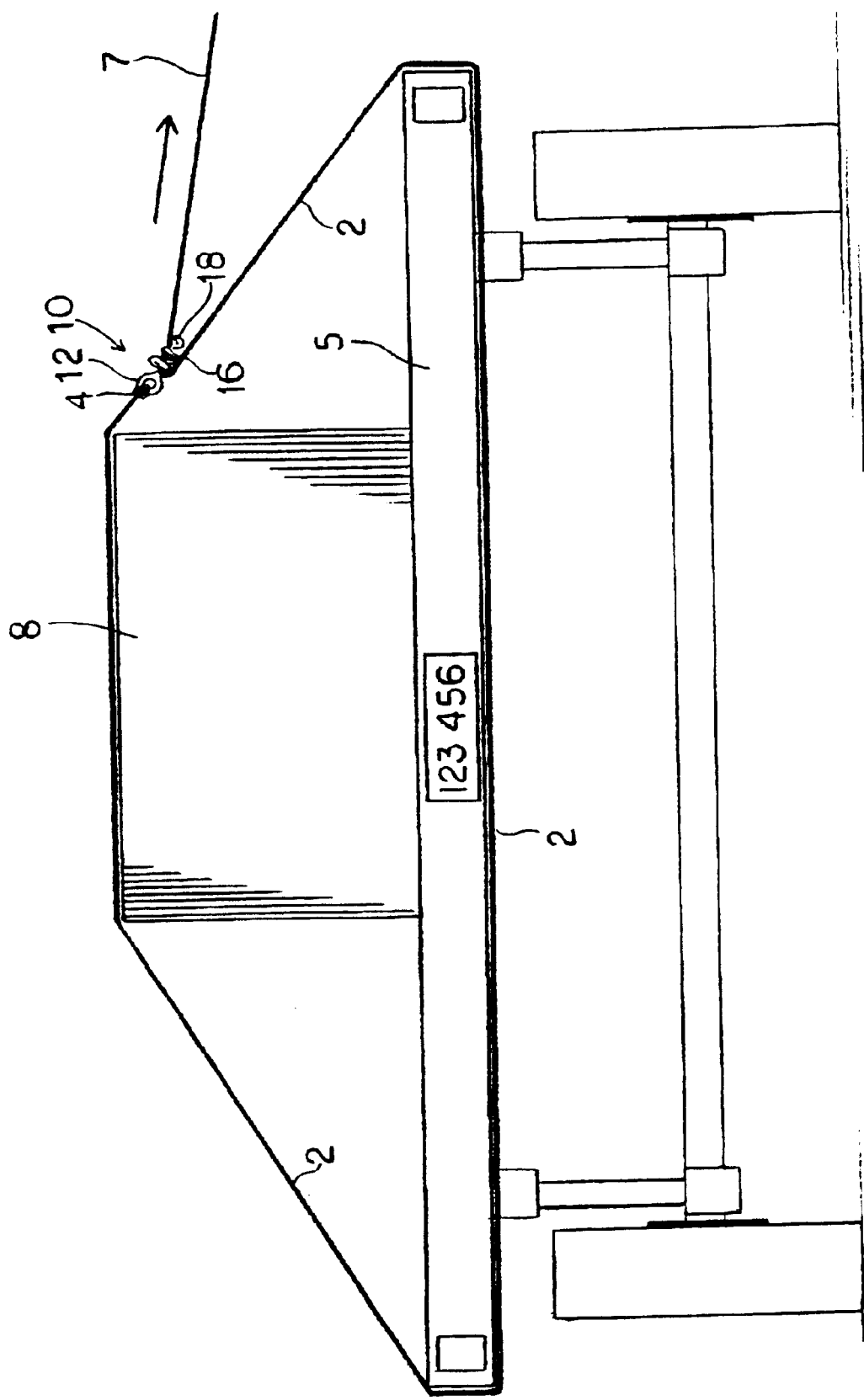

As can be seen in FIG. 1A, the rope could extend through the helical extension passageway 44 from the tip end 18 towards the rope attachment means 12 end, or as shown in FIG. 1B, the rope could extend through the helical extension passageway 44 from the rope attachment means 12 end towards the tip end 18.

Figure 2:
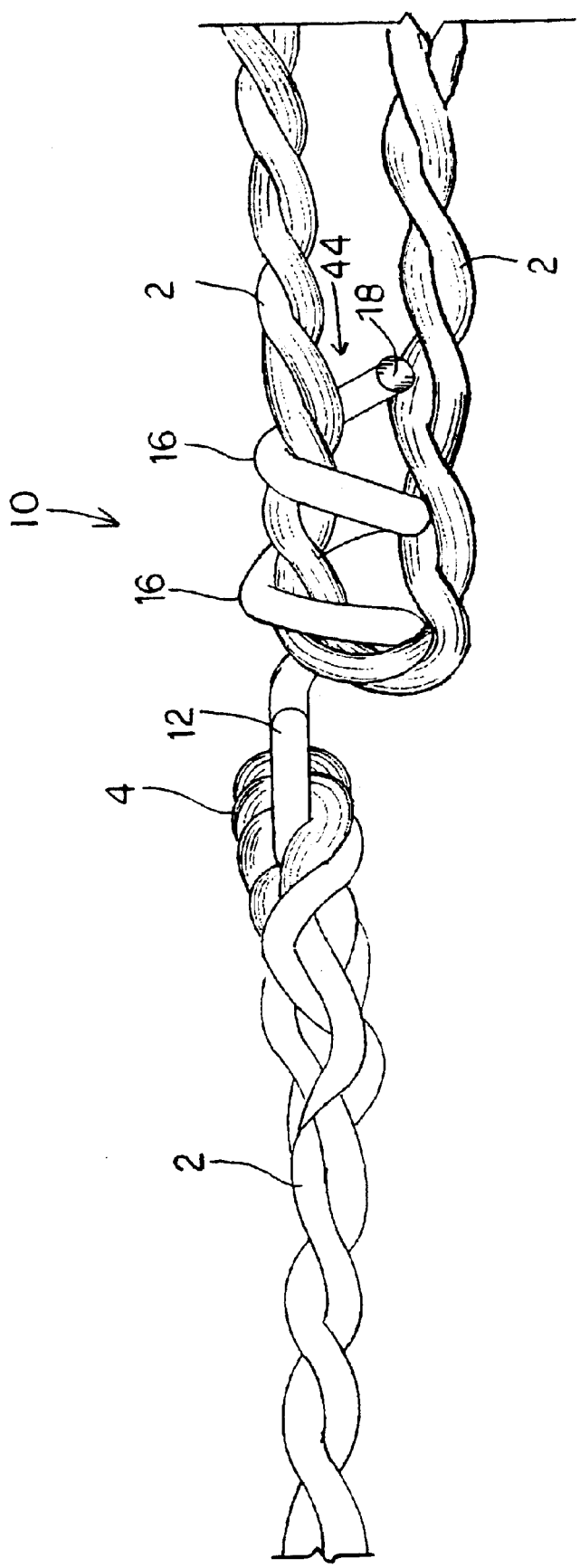
FIG. 2 is a perspective view of a second embodiment of the present invention.
Figure 3:
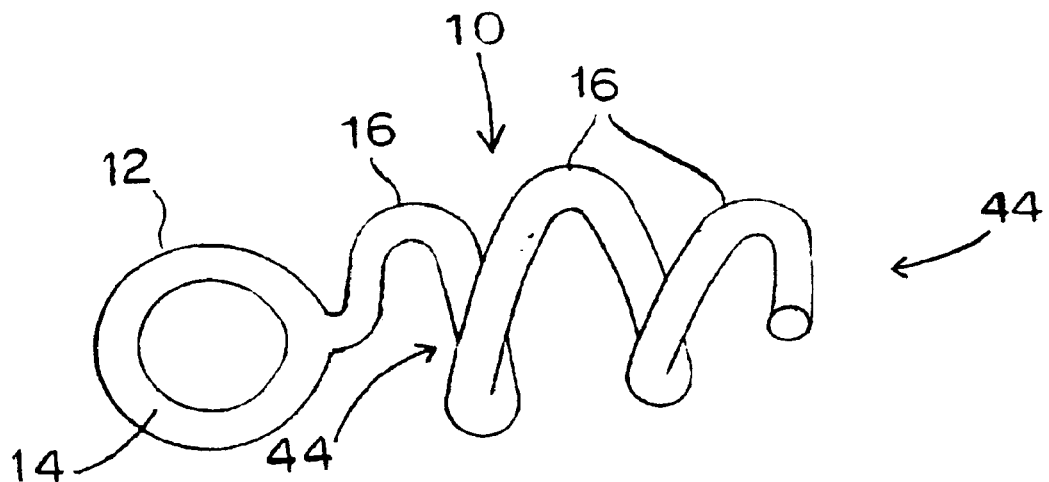
FIG. 3 is a first end view of a third embodiment of the present invention.
Figure 4:
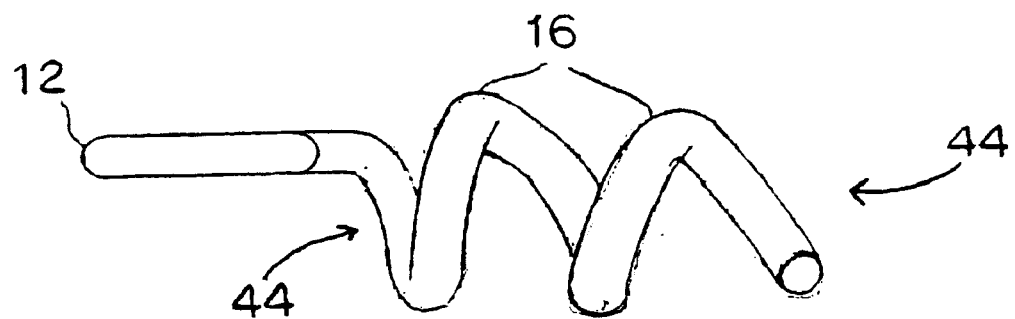
FIG. 4 is a second end view of the embodiment shown in FIG. 3.
Figure 5:
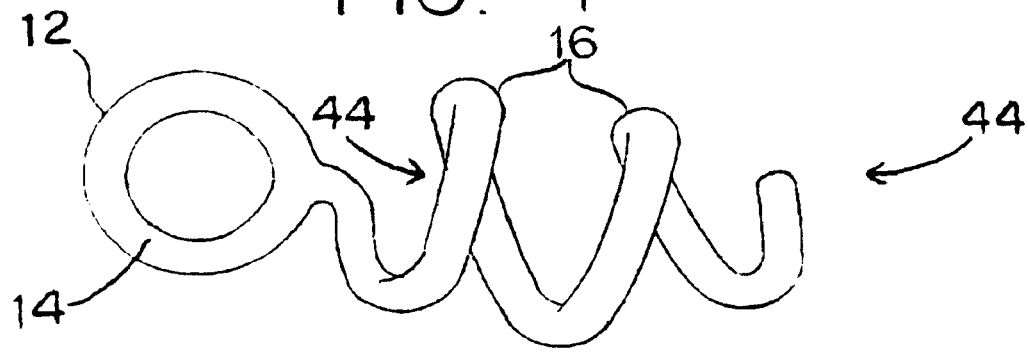
FIG. 5 is a first side view of the embodiment shown in FIG. 3.
Figure 6:
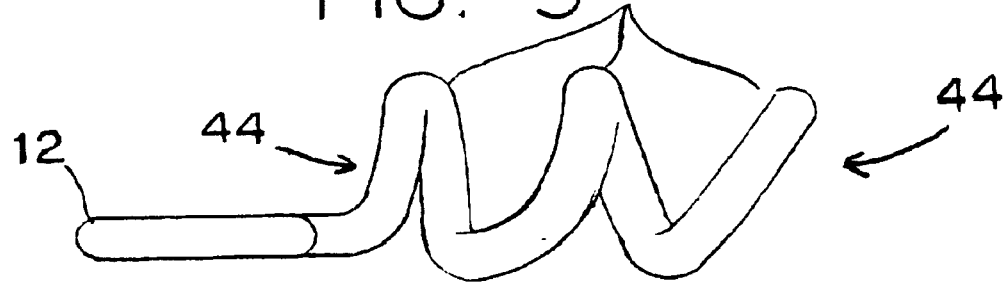
FIG. 6 is a second side view of the embodiment shown in FIG. 3.

FIG. 2 shows a close up of embodiment of FIG. 1B. The rope 2 first end 4 attaches to the tie-down clip 10 at the rope attachment means 12. This attachment can be through any standard means of attaching a rope to an object, such as braiding. In this view, the tie-down clip 10 can be seen having a helical extension 16 and helical extension tip 18. The helical extension 16 defines a passageway 44 therethrough. It is into this passageway in the length of the rope 2 is inserted or wound as shown generally in FIGS. 10A through 10E. The rope can either be inserted through the passageway 44 so that the end of the rope 2 nearest the free end 7 extends away from the tip 18 as shown in FIG. 2, or in the alternative, the rope 2's length could be extended through the passageway 44 so that the free end 7 of the rope is nearest to the rope attachment means 12 end of the clip 10 as extended therethrough (not shown). Referring back to FIG. 2, the rope could be cinched down by drawing the end of the rope having the tip 7 in a direction generally away from the rope attachment means 12. Then the user would merely need to affix that end of the rope so that end of the rope is held taught in relation to the clip 10.

Figure 7:
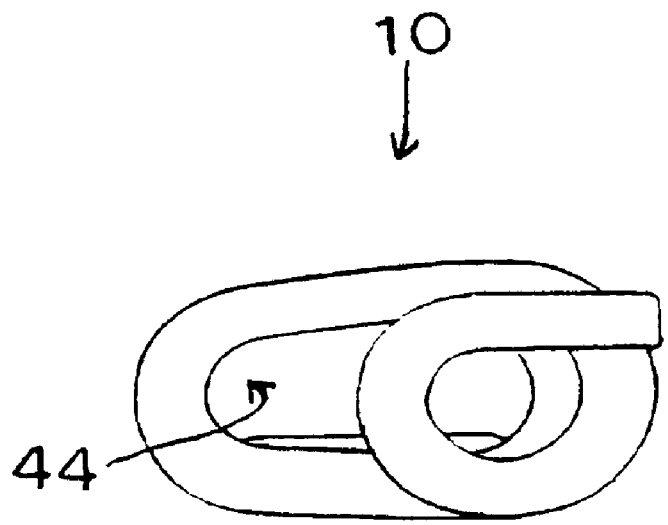
FIG. 7. is a third side view of the embodiment shown in FIG. 3.
Figure 8:
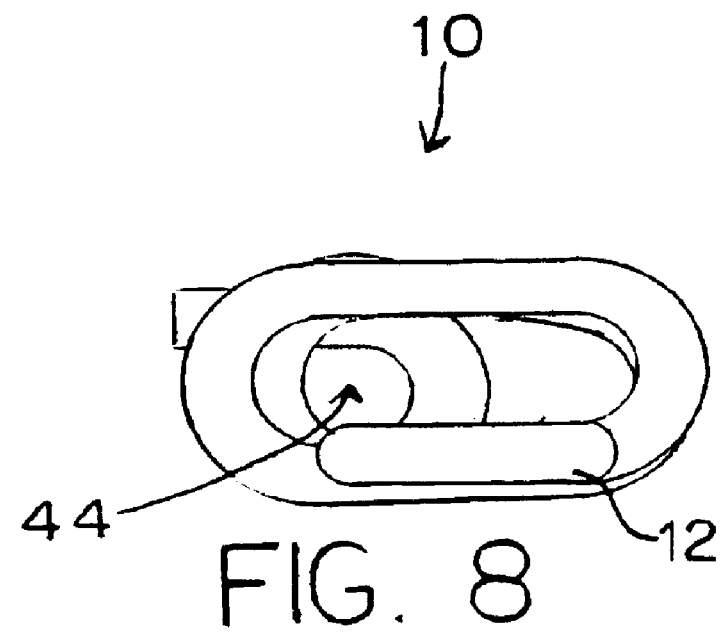
FIG. 8 is a fourth side view of the embodiment shown in FIG. 3.

FIGS. 3 through 8 show various views of a third embodiment of the present invention. In these views, one can note that the preferred rope attachment means 12 is an eyelet 14. This eyelet 14 comprises a ring 17 defining an eye 15 therethrough. The ring 17 lies in a first plane ("A" in FIG. 8). Extending from this eyelet 14 is the helical extension 16 having a number of convolutions. As is shown in this embodiment, the helical extension 16 is generally conical, and particularly as shown in FIGS. 7 and 8, is generally oblong in shape. The helical extension 16 has a convolution nearest the eyelet, the "near convolution" 20. The near convolution 20 has at least one longer side, said longer side lying in a second plane ("B" in FIG. 8) generally parallel to the ring's first plane ("A" in FIG. 8). This oblong shape assists in keeping the cinched rope 2 from unwinding from the clip 10. The preferred helical extension comprises 2 ½ turns, however other amounts of turning is also possible. It is preferred that the distance between adjacent turns is approximately the same width as the width of the rope so that the rope can be slid between adjacent turns and thereby wrapped onto the helical extension, sequentially as shown in FIGS. 10A, 10B, 10C, 10D, and 10E.

Figure 9:
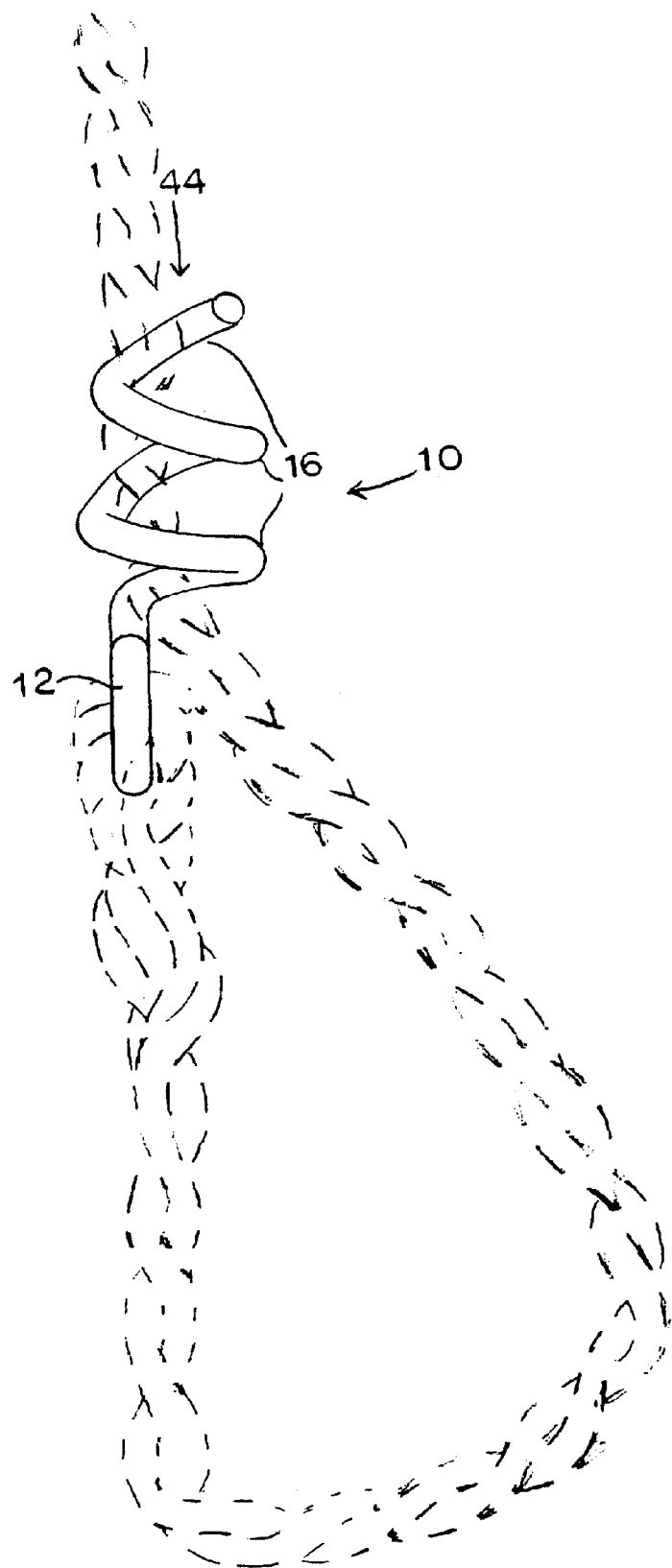
FIG. 9 is an environmental view of a fourth embodiment of the present invention.
Figure 10A:
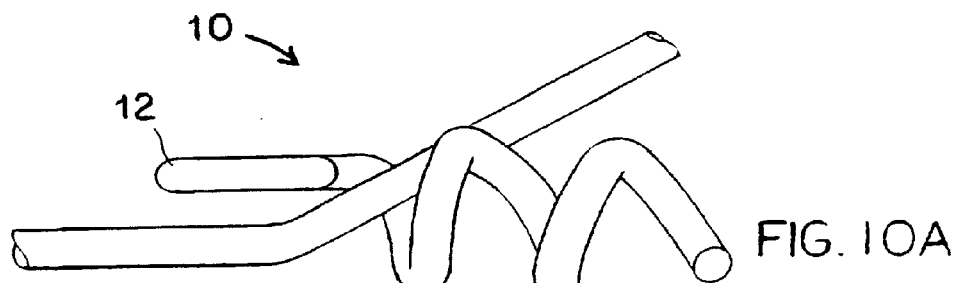
FIG. 10A is a first sequential, side perspective view of a fifth embodiment of the present invention.
Figure 10B:
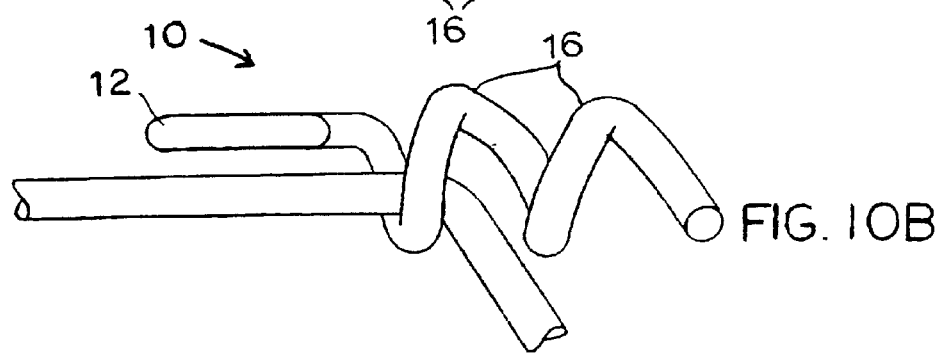
FIG. 10B is a second sequential, side perspective view of the embodiment shown in FIG. 10A.
Figure 10C:
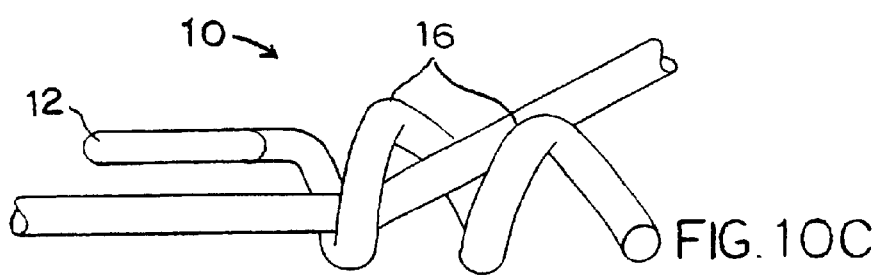
FIG. 10C is a third sequential, side perspective view of the embodiment shown in FIG. 10A.
Figure 10D:
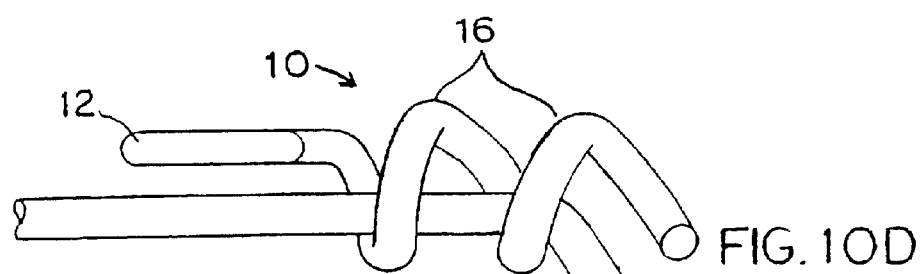
FIG. 10D is a fourth sequential, side perspective view of the embodiment shown in FIG. 10A.
Figure 10E:
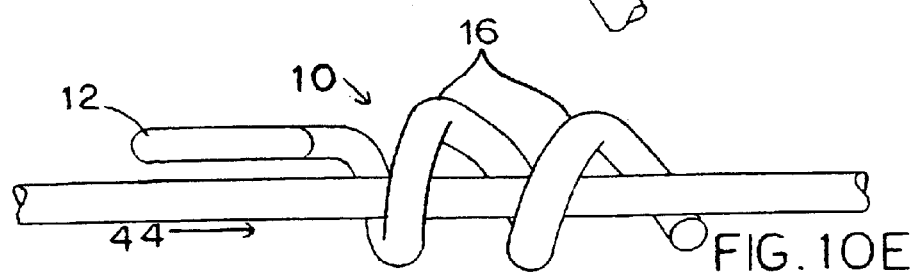
FIG. 10E is a fifth sequential, side perspective view of the embodiment shown in FIG. 10A.

FIG. 9 shows another view of the present invention with the rope in dotted fashion.

The preferred material for manufacture of the invented clip 10 is metal, however, plastic or other materials may also be used.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:
1. A tie-down clip for assisting in the cinching of a rope, said rope having a first end, a second end, a length, and a width, said tie-down clip comprising:
   an eyelet for attachment to said rope first end; and,
   a generally oblong helical extension, extending from said eyelet and terminating in a tip,
      said helical extension comprising two and one-half turns, said extension for receiving therethrough the length of said rope.
2. The tie-down clip of claim 1, wherein said helical extension is generally conical.
3. The tie-down clip of claim 1, wherein said helical extension is generally cylindrical.
4. The tie-down clip of claim 1, wherein said clip is comprised of metal.
5. The tie-down clip of claim 1, wherein said clip is comprised of plastic.
6. A tie-down clip for assisting in the cinching of a rope, said rope having a first end, a second end, a length, and a width, said tie-down clip comprising:
   a rope attachment means for attachment of said tie-down clip to said rope first end; and,
   a generally oblong, conical helical extension, attaching to said rope attachment means,
      said extension for receiving therethrough the length of said rope.
7. The tie-down clip of claim 6, wherein said helical extension comprises two and one-half turns.
8. The tie-down clip of claim 6, wherein said clip is comprised of metal.
9. The tie-down clip of claim 6, wherein said clip is comprised of plastic.
10. A tie-down clip for assisting in the cinching of a rope, said rope having a first end, a second end, a length, and a width, said tie-down clip comprising:
    an eyelet for attachment to said rope first end, said eyelet comprising a ring defining an eye, said ring lying in a first plane; and,
    a helical extension, said helical extension extending from said eyelet and terminating in a tip, said helical extension having a number of oblong convolutions, wherein the convolution nearest said eyelet having a longer side lying in a second plane generally parallel to said first plane, said helical extension for receiving therethrough said length of said rope.
11. The tie-down clip of claim 10, wherein said helical extension comprises two and one-half turns.
12. The tie-down clip of claim 11, wherein said clip is comprised of metal.
13. The tie-down clip of claim 10, wherein said clip is comprised of plastic.

* * * * *